United States Patent

Ahuja et al.

[11] Patent Number: 5,946,679
[45] Date of Patent: Aug. 31, 1999

[54] SYSTEM AND METHOD FOR LOCATING A ROUTE IN A ROUTE TABLE USING HASHING AND COMPRESSED RADIX TREE SEARCHING

[75] Inventors: Ritesh Ahuja, Beltsville, Md.; Roy Illingworth, Arlington, Va.; Hemant Kanakia, Hyattsville; Bakul Shah, Silver Spring, both of Md.

[73] Assignee: Torrent Networking Technologies, Corp., Landover, Md.

[21] Appl. No.: 08/904,287

[22] Filed: Jul. 31, 1997

[51] Int. Cl.$^6$ ...................................... G06F 17/30
[52] U.S. Cl. ...................................... 707/3; 707/7
[58] Field of Search ........................ 707/3, 7; 395/200.68, 395/200.69, 200.7, 200.71, 200.72

[56] References Cited

U.S. PATENT DOCUMENTS

| | | | |
|---|---|---|---|
| 5,226,165 | 7/1993 | Martin | 707/6 |
| 5,732,072 | 3/1998 | Thanner et al. | 370/255 |
| 5,829,004 | 10/1998 | Au | 707/100 |

OTHER PUBLICATIONS

Ka Lun Eddie Law and Alberto Leon–Garcia: Multicast and Self–Routing in ATM Radix Trees and Banyan Networks; Feb. 4, 1995; pp. 951–959.

Keith Sklower; A Tree–Based Packet Routing Table for Berkeley Unix; Winter '91; pp. 93–103.

Primary Examiner—Paul R. Lintz
Assistant Examiner—John C. Loomis
Attorney, Agent, or Firm—Fenwick & West LLP

[57] ABSTRACT

A method and apparatus searches table information using keys of varying lengths. Based on criteria, the method selects one of three processes for performing the search. The first routine is a reverse hash search process which is useful for searching information with few key lengths. The second process is a hierarchical search routine which is useful for searching information with many key lengths. The third process is a compressed radix tree search which is useful for searching information that presents significant time barriers to the first two routines.

31 Claims, 11 Drawing Sheets

SYSTEM AND METHOD FOR LOCATING A ROUTE IN A ROUTE TABLE USING HASHING AND COMPRESSED RADIX TREE SEARCHING

FIELD OF THE INVENTION

The invention relates generally to searching of tables, and specifically to route tables given a large field to match against as a search key.

BACKGROUND OF THE INVENTION

Various packet switching architectures are known for interconnecting and exchanging data among computers. Of these, the Internet is the most popular. The Internet, short for Internetwork, is global in scope and connects networks and computers across businesses, organizations and residences around the world. Intranets have similar architectures but their scope is restricted to single businesses and organizations. Typically, messages sent from one host computer to another travel through a number of routers that form the connection between source and destination computers. Each computer of the Internet, or an Intranet, is assigned an identifying string of bits called an address. The address of an intended destination host computer is added to a packet by a source computer as the packet is being sent. The process of packet delivery is referred to as routing and the equipment that performs this task is a router. A router sorts out incoming packets and sends them toward the respective destinations. Each router must contain a current topological layout of the Internet which indicates which paths to take to reach any host computer. Routers periodically exchange topological information using signaling protocols that are known as routing protocols. In this way, each router is updated with respect to Internet additions and deletions.

In order for routers to relay messages toward their proper destinations, each host machine must have a unique identification address. Due to the high number of interconnected computers, over forty million as of 1995, it was deemed prudent in the early years of the Internet to introduce a hierarchy of address strings. This is the essence of the Internet Protocol. Under the Internet Protocol, the most significant bits of an address string designate a network and the remaining portion is reserved for identifying host computers that are connected to the designated network. It was also realized that a further hierarchy might be desired by large organizations, so the host computer part of the string is further subdivided into a subnet address and host identification number. For a given network address, the corresponding organization chooses the number of subnets and the size of the subnetwork field, giving rise to many different ways of partitioning addresses. A thirty-two bit address, therefore, might designate a network, a subnetwork, and a host computer. Note that as the bits are processed from most significant to least significant, the granularity of the addressed entity becomes finer. In other words, a set of most significant bits addresses a network, a set of next most significant bits designates a subnetwork, and the remaining set of bits denotes a machine. The network field could range from eight to twenty-four bits, depending on the class of network. A class A network is a large network and has a field of eight bits. A class B network is smaller and has a field of sixteen bits, while a class C network is smaller yet and has a field of twenty-four bits. Under the Internet Protocol, the length of a network field is determined from the most significant bits of the address. If the first bit of the address is a "0", a class A network is designated; if the first two bits are "10", a class B network was indicated; and if the first three bits are "110", a class C network is indicated. The subnetwork and host computer fields are contained in the remainder of the thirty-two bits. As indicated above, the choice of the size of the subnet field is dependent on the organization rather than universally accepted boundaries. The conventional method for determining the end of the subnetwork field and the beginning of the host field is to use a bit mask and a masking function.

The routing of a received packet is based on the accompanying address string. The address string is used as a search key in a database which contains the address string along with other pertinent details such as which router is next in the delivery of the packet. The database is referred to as a routing table, while the link between the current router and the next router is called the next hop in the progress of the packet. The routing table search process depends on the structure of the address as well as how the table is organized. As an example, a search key of a size less than eight bits and having a nonhierarchical structure would most efficiently be found in a routing table organized as a series of address entries. The search key would be used as an index in the table to locate the right entry. For a search key of a larger size, say thirty-two bits, the corresponding routing table may have more than ten thousand entries. Organizing the database as a simple table to be searched directly by an index would waste a large amount of memory space, because most of the table would be empty.

Conventional routers break up the search process into three steps. The first step is to determine whether the router is directly connected to the destination host computer. If this is the case, the message is one hop from the destination and should be routed in that direction. If the destination computer is not directly connected to the router, the second step is to determine in which topological direction the destination network lies. If the direction is determined from the topological layout, the message should be routed that way. If it is not determined, the third step is to route the message along a default link.

Typically, the first step is performed using a linear search of a table containing the thirty-two bit addresses of host computers directly connected to the router. Reflecting the local topology, each entry in the address table is connected to a corresponding output interface leading directly to the addressed computer. When a destination address is received by a router, the full thirty-two bits are compared with each of the destination addresses in the table. If a match is made, the message is sent directly to the corresponding destination via the specified router interface. If no match is made, the second step of the routing procedure is taken.

The second step, determining the direction of the destination network, is not usually performed by a linear search method through a table since the number of network addresses would make such a table unwieldy. In the days when address strings conformed to the three-level hierarchy of network address, subnet address and host identification, routers performed the determination using one of several known techniques, such as hashing, Patricia-tree searching, and multilevel searching. In hashing, a hash function reduces the network portion of the address, producing a small, manageable index. The hash index is used to index a hash table and search for a matching hash entry. Corresponding to each hash entry of the hash table is the address of an output interface pointing in the topological direction of a corresponding network. If a match is found between the hashed network portion and a hash entry, the message is directed towards the corresponding interface and destination network.

Hashing reduces a large unwieldy field to a small manageable index. In the process, however, there is a chance that two or more fields may generate the same hash index. This occurrence is referred to as a collision, since these fields must be stored in the same location in the hash table. Further searching is needed to differentiate the entries thus in collision. Collisions, therefore, reduce the efficiency obtained by using the hashing search and in the worst case, where all permissible addresses coalesce to a single index, render hashing practically useless as a search process.

Patricia-tree searching avoids the collisions encountered by hashing methods. The exact search algorithm is complex and need not be fully described here. In short, this method of searching requires that all address strings and accompanying information, such as related route information, be stored in a binary tree. Starting from the most significant bit position within the address string, the search process compares the address, bit by bit, with the tree nodes. A matched bit value guides the search to visit either the left or the right child node and the process is repeated for the next bit of the address. The search time is proportional to the size of the longest address string stored. In Patricia-tree searching, the difference between the average search time and the worst case search time is not very large. Moreover, the routing table is organized quite efficiently. Typically, it requires less memory than comparable routing tables of hashing methods. Patricia-tree searching handles the worst case searches better than the hashing methods, but in most cases it takes significantly longer to locate a match. Thus, many conventional routers use a combination of hashing and Patricia-tree searching. This combination is called multilevel searching.

Multilevel searching joins hashing with Patricia-tree searching. A cache stores a hash table containing a subset of most recently, and presumably most commonly, routed network addresses, while a Patricia tree stores the full set of network addresses. As a message is received, the destination address is hashed onto the table. If it is not located within a predetermined period of time, the address is passed to the Patricia-tree search engine which ensures that the address, if stored, will be found.

The three-level hierarchy of the Internet Protocol was replaced by the Classless Internet Domain Routing (CIDR) protocol. The development of CIDR was necessitated by the explosive growth in the size of the Internet and the near exhaustion of the Class B network addresses. In summary, CIDR specifies how two or more organizations that share a common path to the next hop may share a single routing table entry and thus reduce the total maximum size of a routing table. With CIDR, the search rule is easy to describe, but difficult to implement. The matching of a search key to an address string stored in the routing table requires that the longest number of consecutive bits, starting with the most significant bit, are matched. What makes this matching rule hard to implement is allowing a routing table to contain multiple partial matches. When such is the case, a router is required to use the entry with the longest prefix match for routing the packet correctly. Allowing a partial match rule and finer granularity in defining fields with the address boundary results makes conventional hashing methods inappropriate to use. The Patricia-tree search also becomes more complex and requires backtracking of tree nodes already visited. What is needed is a routing method that quickly and efficiently searches a routing table for addresses using a longest prefix matching rule.

SUMMARY OF THE INVENTION

In accordance with the present invention, an adaptive information search method includes performing a reverse-hashing search in response to address keys having a characteristic, performing a hierarchical-hashing search in response to said keys not having the characteristic, and performing a compressed radix tree search in response to the hashing searches not providing results according to a specified criterion.

In one aspect of the invention, the characteristic is the variability of lengths of the keys; in another aspect, the specified criterion is the ability to identify matches within a particular period of time.

Also in accordance with the present invention, an adaptive information search method for information referenced by keys includes performing a hashing search and performing a compressed radix tree search in response to the hashing search not providing results according to a specified criterion. In some instances, the hashing search is a hierarchical hashing search and in others it is a reverse-hashing search.

The hierarchical hashing search method includes hashing an initial portion of a target key to obtain an initial hash entry, determining, in response to the initial hash entry, a set of mask lengths, and iteratively searching for subsequent hash entries using the set of mask lengths and further mask lengths determined as a result of the searching.

The reverse hashing search method includes searching using a target key in its entirety and, if no match results, iteratively hashing portions of the target key using a set of mask lengths selected in decreasing size order.

The compressed radix tree search method includes selecting an initial tree node and corresponding length as a current node and a current index length, forming an intermediate key in response to a most significant portion of a target key, the most significant portion corresponding to the current index length, comparing the intermediate key with a skip field corresponding to the current node and, if correspondence is determined, determining existence of a child node having a child relationship to the current node, resetting the current node and current index length to correspond to the child node and iterating this processing for the child node, and then iterating the processing for additional nodes based on proximity to the root node.

Information searched according to a compressed radix tree is organized by forming a node corresponding to a partial key having a selected length, storing in the node a sub-tree indicator and sub-tree index length indicator corresponding to any child nodes, and iterating this procedure until the information is fully organized.

Further in accordance with the present invention, an adaptive information search system includes a hashing search subsystem adapted to perform a hashing search, and a compressed radix tree search subsystem adapted to perform a compressed radix tree search if the hashing search does not providing results according to a specified criterion.

Apparatus for the compressed radix tree search includes a register set storing a root node pointer, a root index length, a default route pointer, a current node pointer, a current node index, and a result route pointer; a number of tree nodes, each containing a skip-bits field, a skip-length field, a route-pointer field, a has-route field, a tree-pointer field, a has-subtree field, and a tree-index-length filed; and a processor operatively connected to the register set and the plurality of tree nodes, the processor comparing a target address with data corresponding to the tree nodes according to a compressed radix tree search, starting from a root node specified by the root node pointer and route index length and progressing therefrom by associating with the current node pointer and current node index select ones of the tree nodes based on the skip-bits field, the skip-length field, the tree-pointer field, the has-subtree field, and the tree-index length field, the processor producing as output in response to a match being found with the target address a route specified by the route-pointer field and the has-route field of a corresponding one of the plurality of tree nodes, the processor further producing as output in response to no match being found a route specified by the default route pointer, the processor further providing said output on the result route pointer.

The features and advantages described in the specification are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

DETAILED DESCRIPTION

The figures depict a preferred embodiment of the present invention for purposes of illustration only. One skilled in the art will readily recognize from the following discussion that alternative embodiments of the structures and methods illustrated herein may be employed without departing from the principles of the invention described herein.

Figure 1:
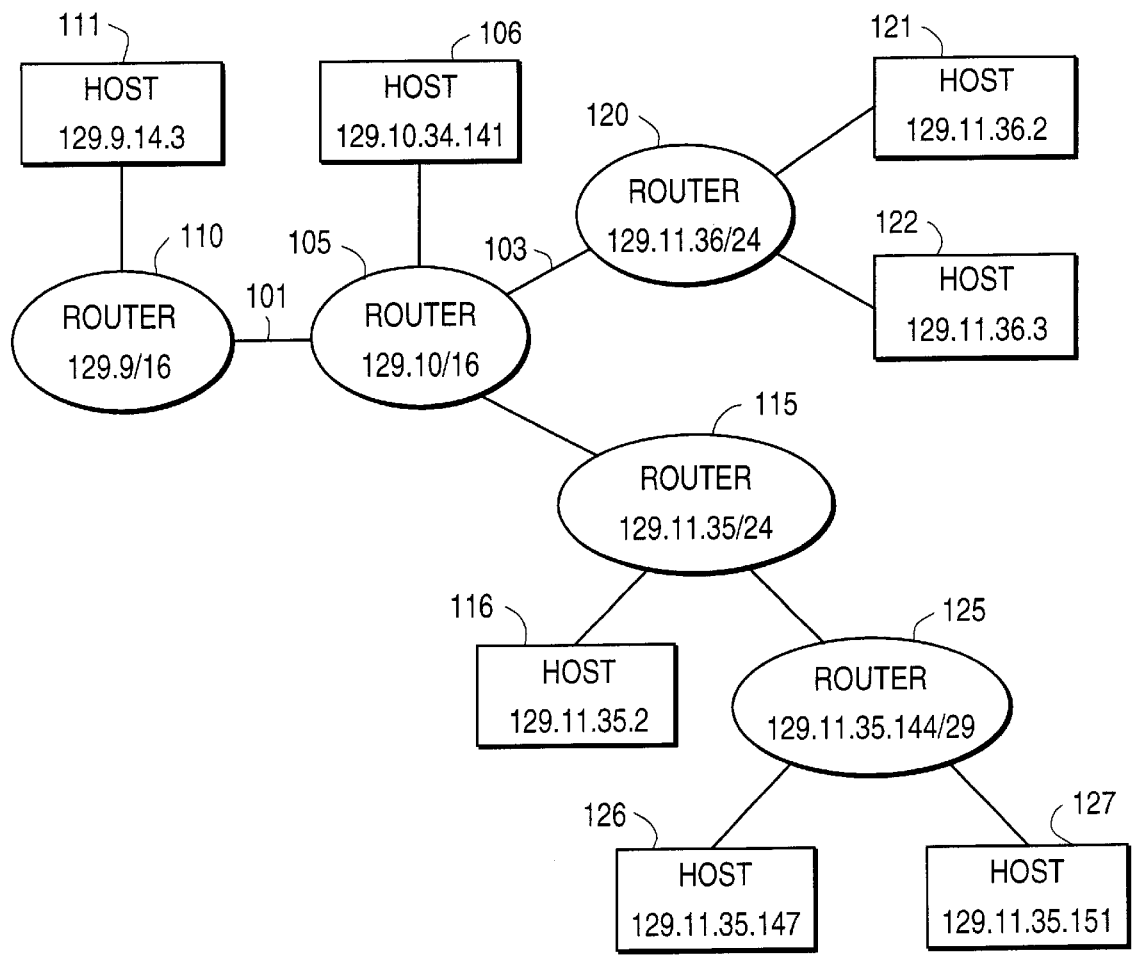
FIG. 1 is a block diagram illustrating a conventional computer network.

Referring to FIG. 1, a block diagram of the layout of a conventional computer network 100 is shown. Network 100 is comprised of router 105, router 110, router 115, router 120, and router 125. Host computer 106 is directly connected to router 105; host computer 111 is directly connected to router 110; host computer 116 is directly connected to router 115; host computers 121 and 122 are directly connected to router 120, and host computers 126 and 127 are directly connected to router 125. Router 105 is connected to router 110 by input/output bus 101, to router 115 by input/output bus 102, to router 120 by input/output bus 103, and to host 106 by input/output bus 104. It is noted that other computers and routers not shown in the diagram may be connected to those above.

The most efficient path for a message sent from host computer 111 to host computer 126 is through router 110, router 105, router 115, and router 125. Each router, when it receives the message, determines the direction of the next hop by processing the destination address of the message. In this case, the destination computer, host 126, has a thirty-two bit address, 129.11.35.147, of which the twenty-nine most significant bits, 129.11.35.144/29, address the destination subnetwork router 125, and the twenty-four most significant bits, 129.11.35/24, designate the destination subnetwork router 115. Those skilled in the art will recognize that the Classless Internet Domain Routing (CIDR) does not require that the length of a subnetwork address be twenty-nine bits or twenty-four bits, although these are the lengths used in this discussion.

Ideally, once router 105 receives a message with a destination address of 129.11.35.147, it should determine that output bus 102, leading to router 115, is the most efficient next hop for the message. Router 105 does this by first determining whether the destination address designates a host computer directly connected to router 105. Conventionally, this is performed by using a simple lookup table in which a set of local addresses are associated with a set of pointers addressing the associated router outputs. For example, router 105 contains a table which stores, possibly among other local addresses and pointers, the address of host computer 106 and the associated address interface for bus 104. Router 105 compares the received address with those in the table. In this case, the destination address 129.11.35.147 does not match any address in the table, including that of host 106, since it is not a local address.

The next step router 105 takes is to determine in which direction the message should be sent. Conventionally, this is performed by such techniques as hashing, a Patricia-tree search, or a multilevel search. Except for the Patricia-tree search, none of these conventional techniques will properly process a CIDR address because they were designed for a class-based internet addressing structure. The first step taken by them is to determine the length of the network address as defined by the Internet Protocol. Since the two most significant bits of the address 129.11.35.147 are "10", the proper address length under this protocol is sixteen bits. Therefore, the conventional techniques will determine that the network address of the destination address is the sixteen most significant bits, 129.11/16. However, for the CIDR address in the example, this determination is counter-productive since the addresses of router 115 and router 120 share these sixteen most significant bits. As a result, these techniques will not be able to determine which output bus, 102 or 103, is the most efficient. The Patricia-tree technique, however, processes, bit by bit, the entire routing table tree without regard to the class of the address. It will, therefore, work in this scenario, but is too slow and expensive for practical use.

Figure 2:
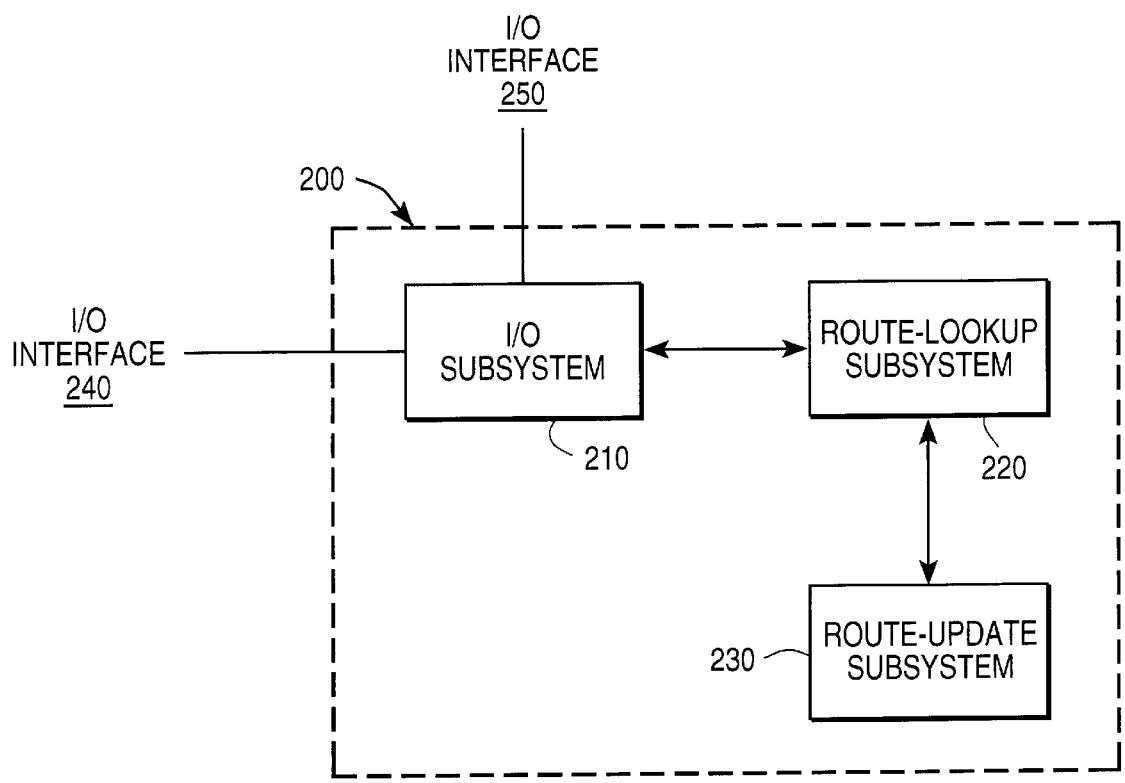
FIG. 2 is a block diagram illustrating the different subsystems of a router.

Referring to FIG. 2, there is shown the internal structure of a router 200 that may be used to implement router 105 in accordance with the present invention. Route-lookup subsystem 220 of router 200 stores either a partial or a complete topological layout of the Internet. The topological layout is updated by route-update subsystem 230 which adds and deletes Internet addresses in accordance with information received from other routers in the network, such as routers 110, 115, and 120. An input/output subsystem 210 receives packets on the input/output interfaces 240 and 250 of the router. The destination address of a received packet is passed onto the route-lookup subsystem 220 which finds the longest prefix match in the topological layout, and returns the best route found to the input/output subsystem 210. The received packet is then sent, by the input/output subsystem 210, to the output interface 240 or 250 as determined by the route-lookup subsystem 220. Since route-lookup subsystem 220 is invoked for every packet received by input/output subsystem 210, route-lookup subsystem 220 must find the best match before the next packet is received by input/output subsystem 210. If it fails to do so, router 200 will not be able to keep up with the load of incoming packets and will be forced to drop some. This behavior is extremely undesirable. The preferred embodiment avoids this problem by operating at a speed that allows router 200 to properly route all incoming packets.

Figure 3:
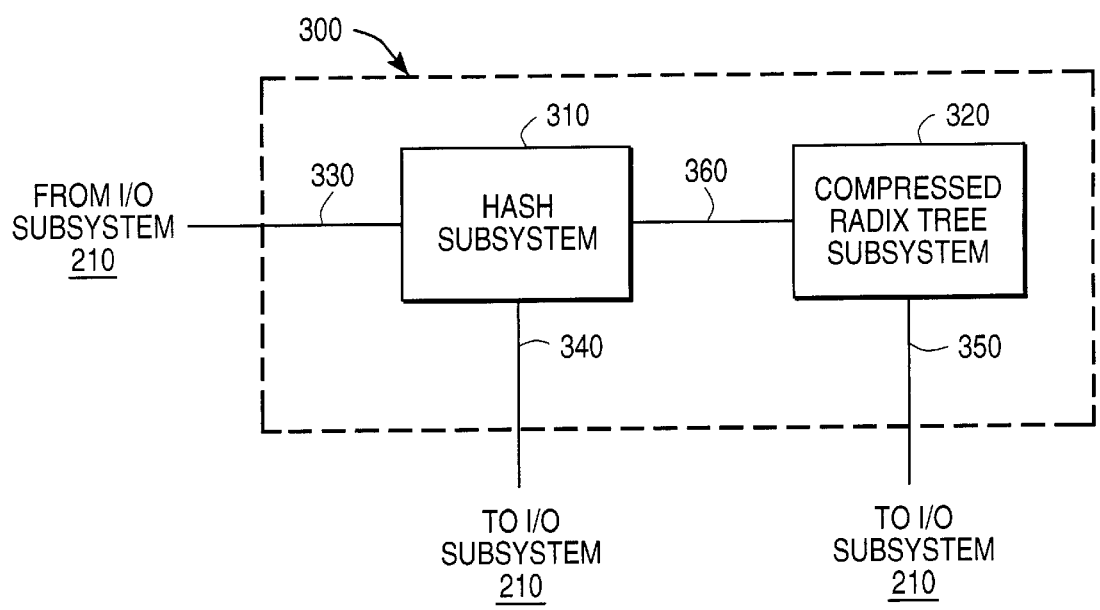
FIG. 3 is a block diagram illustrating a system for locating a route in accordance with the present invention.

Referring to FIG. 3, there is shown a preferred embodiment of a route locator system 300 in accordance with the present invention. Route locator system 300 is analogous to route-lookup subsystem 220 and contains a set of destination addresses and a corresponding set of output pointers. System 300 is comprised of two subsystems: hash subsystem 310, which contains a subset of the most commonly used network addresses and associated output pointers, and compressed radix tree subsystem 320, which contains a full set of network addresses and associated output pointers. Hash subsystem 310 may be implemented as either a reverse hash subsystem, shown in FIG. 5, or a hierarchical hash subsystem, shown in FIG. 7. In order to achieve best performance, the reverse hash subsystem is chosen where the number of different key lengths in the system is small, and the hierarchical hash subsystem is chosen otherwise. The compressed radix tree subsystem 320 is shown in further detail in FIG. 9. Preferably, hash subsystem 310 and compressed radix tree subsystem 320 are connected by a communication line 360. Hash subsystem 310 has an input line 330 and an output line 340, both connected to an input/output subsystem, such as subsystem 210. Compressed radix tree subsystem 320 also has an output line 350 connected to the input/output subsystem.

In one embodiment of system 300, subsystems 310 and 320 are independently implemented and may therefore be configured to simultaneously process a destination address, the output being driven by whichever subsystem returns a result first. In another embodiment, subsystems 310 and 320 are configured serially such that compressed radix tree subsystem 320 begins processing a destination address only upon failure of hashing subsystem 310 to find a match, or to find a match within a particular period of time.

Route locator system 300 is preferably implemented as a mixed hardware/software system. In alternative embodiments it may be implemented as a software program or as a hardware circuit. Hash subsystem 310 and compressed radix tree subsystem 320 are preferably implemented as hardware circuits according to the figures described below, but may be implemented as software programs or as a mixture of hardware and software.

Preferably, hash subsystem 310 and compressed radix tree subsystem 320 are connected by a communication line 360. Hash subsystem 310 has an input line 330 and an output line 340, both connected to an input/output subsystem, such as subsystem 210. These lines are diagrammed as separate communication lines, although in another embodiment input data and output data is transmitted over the same line.

Figure 4:
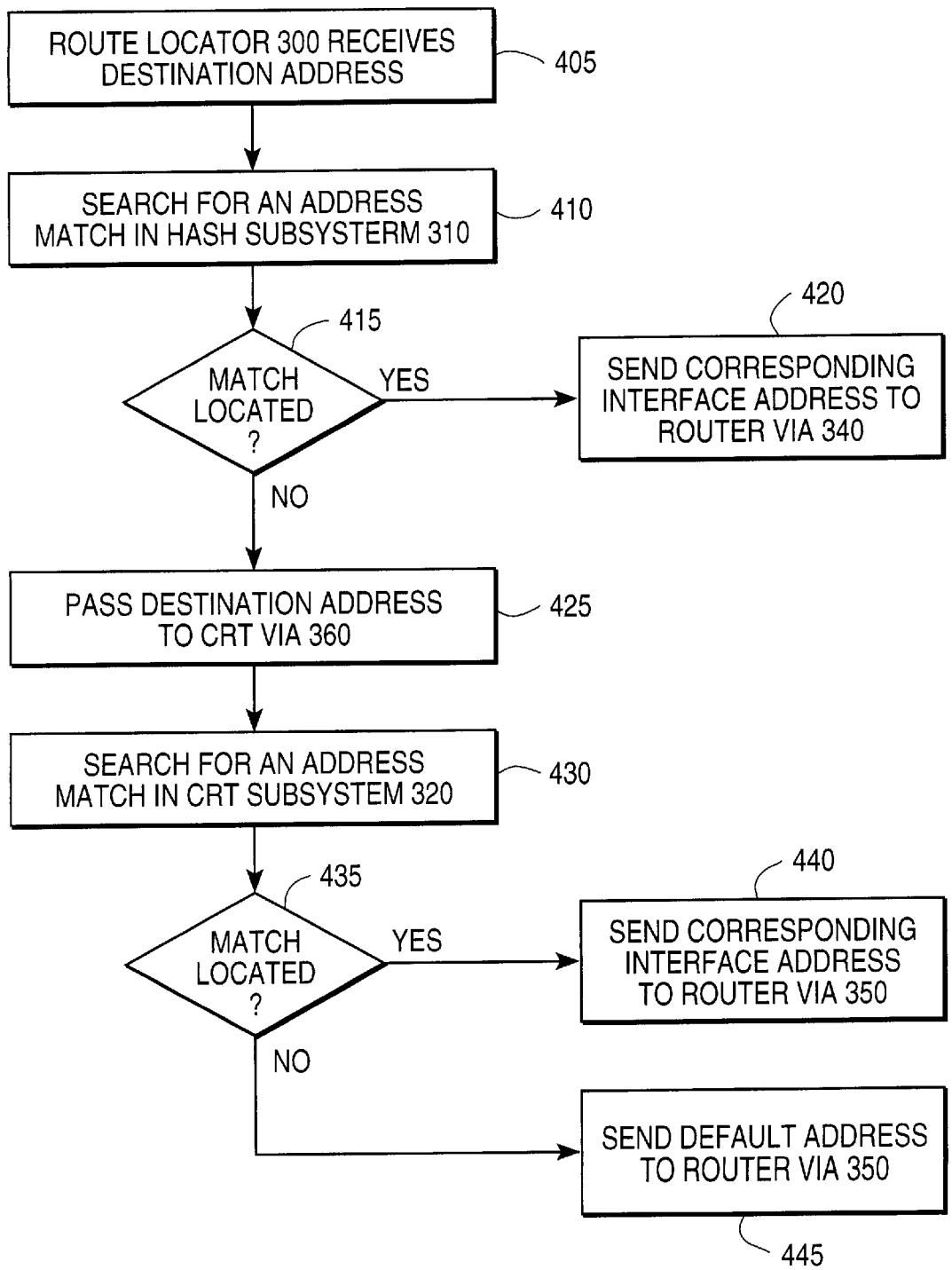
FIG. 4 is a flow chart illustrating a method for locating a route output in accordance with the present invention.

Referring to FIG. 4, there is shown a flow chart of the preferred operation of route locator system 300 which, upon receiving a destination address from the input/output subsystem 210, attempts to locate a match within the storage tables of subsystems 310 and 320. In step 405, a destination address is received by the route locator system 300 over input line 301 from input/output subsystem 210. The address corresponds to the destination address of a message recently received by the router. In step 410, the route locator system 300 first searches for the message address in the subset of addresses stored in hash subsystem 310. At step 415, a determination is made as to whether a matching address was located in hash subsystem 310. If the address is located within subsystem 310, the pointer address of the corresponding output line is sent to input/output subsystem 210 over output line 340 in step 420. Using the pointer address, input/output subsystem 210 will then output the message along the designated output. If the message address is not found within subsystem 310, the address is passed to compressed radix tree subsystem 320 on the communication line 360 in step 425. In step 430, the route locator system 300 then searches for the packet address in compressed radix tree subsystem 320. In step 435, a determination is made as to whether the address was located in compressed radix tree subsystem 320. If the message address is located in subsystem 320, the corresponding output address, which should be the most efficient output address, is returned to input/output subsystem 210 by communication line 350 in step 440. If the message address is not located in subsystem 320, a default output address is returned to input/output subsystem 210 by output bus 350. The router, such as router 105, then outputs the message along the designated output.

Figure 5A:
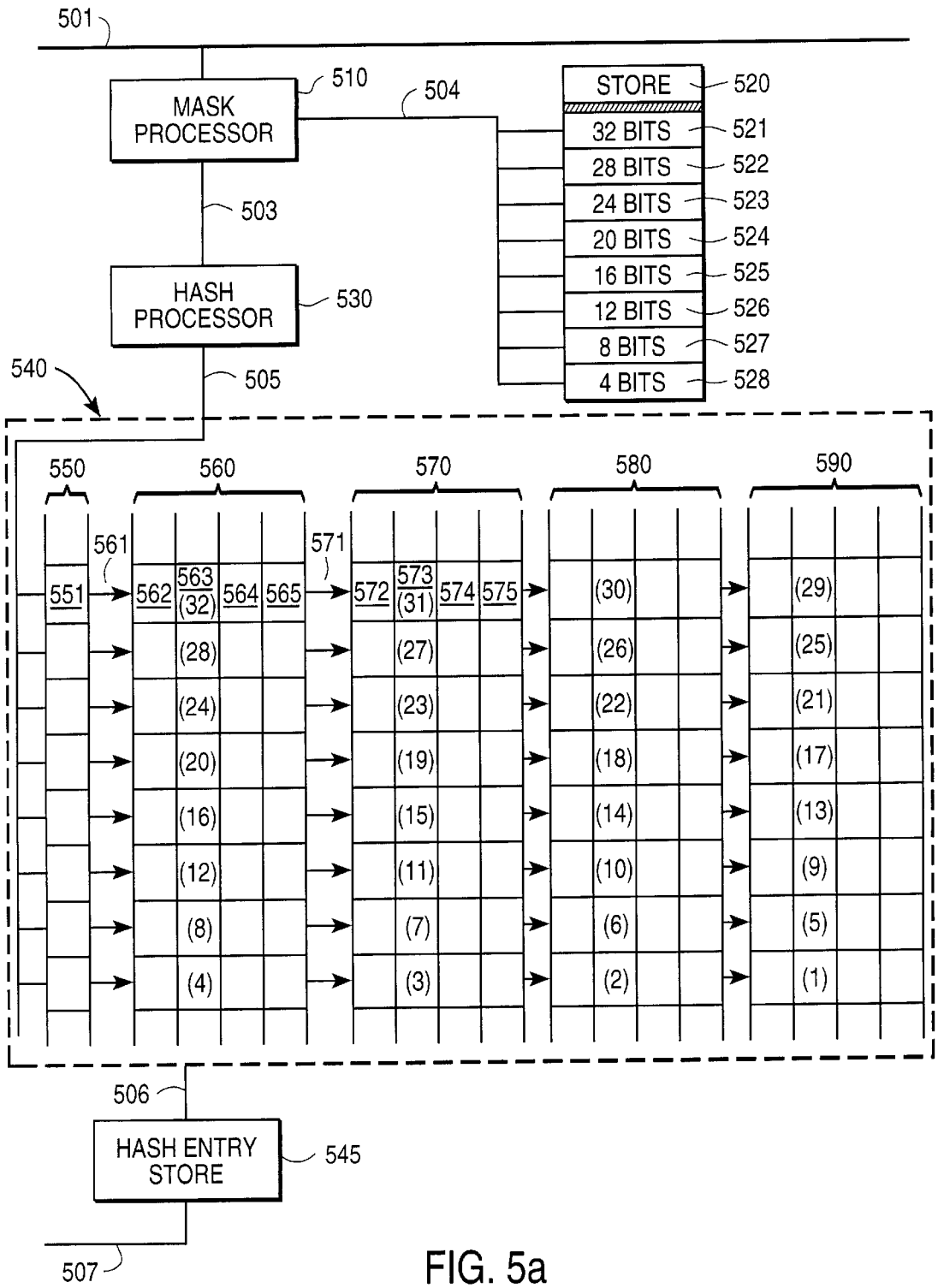
FIG. 5a is a block diagram illustrating a system for performing a reverse hash search in accordance with the present invention.

Referring to FIG. 5a, there is shown a subsystem 500 for performing a reverse hash search in accordance with the present invention. Subsystem 500 is the first and simpler of the two described embodiments of hash subsystem 310. It is preferably used in routing environments with few mask (i.e., key) lengths, such as the internal networks of organizations. Subsystem 500 is connected to an input/output subsystem, such as subsystem 210, by communication lines 501 and 507, analogous to lines 330 and 340, and to a compressed radix tree subsystem, such as subsystem 320, by communication line 502, analogous to 360. The major components of subsystem 500 are mask function processor 510, mask length store 520, hash function processor 530 hash table 540, and hash entry store 545.

Briefly outlining the operation of reverse hash subsystem 500, mask function processor 510 generates a masked address from the destination address, using an initial mask length from mask length store 520. Mask length store 520 is a set of registers storing, in decreasing order, mask length values. Hash function processor 530 computes a hash index into hash table 540 based on the masked address provided by mask function processor 510. Hash table 540 has entries with masked addresses and corresponding mask lengths and route pointers, as well as pointers to subsequent hash entries for the same hash index. Hash entry store 545 temporarily holds entries, one at a time, from table 540 as the masked addresses of the entries are examined for a match. For this purpose, store 545 is connected to table 540 by communication line 506 and comprises a series of registers of a sufficient length to handle a hash entry of table 540. In addition output line 507 is connected to store 545.

Figure 5B:
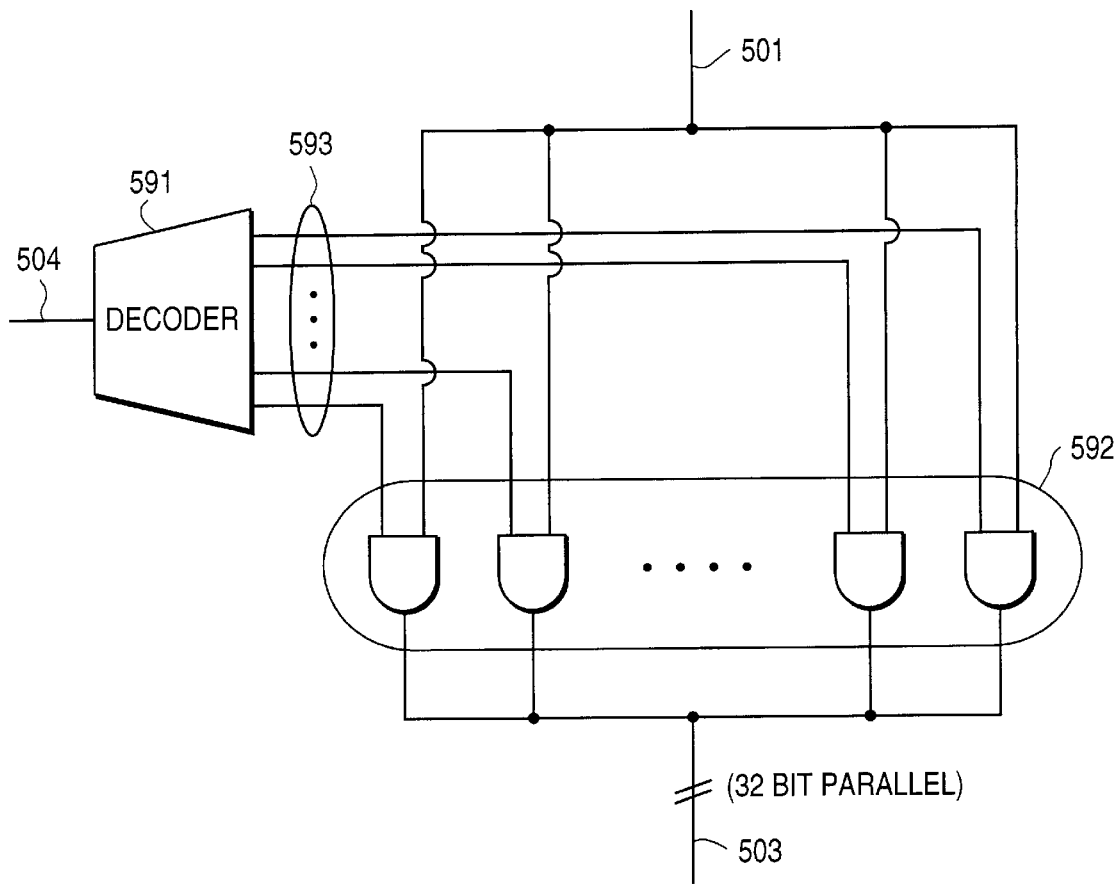
FIG. 5b is a logic circuit diagram illustrating a mask function processor in accordance with the present invention.

Mask function processor 510, further described in FIG. 5b, is implemented using conventional logic circuitry configured to function as described herein and is connected to hash function processor 530 by communication line 503, and to mask length store 520 by communication line 504. Hash function processor 530 is, in a preferred embodiment, similarly implemented using conventional logic circuitry, configured to function as described herein and connected to hash table 540 by communication line 505.

Mask length store 520 comprises a number of registers, each storing a mask length. In a preferred embodiment, store 520 comprises eight registers, 521 through 528, which store, respectively, mask lengths of thirty-two bits, twenty-eight bits, twenty-four bits, twenty bits, sixteen bits, twelve bits, eight bits, and four bits. Each register is capable of being enabled in a conventional manner by mask processor 510, allowing store 520 to provide specific mask lengths as needed.

Hash table 540 is stored in conventional random access memory which receives input addresses and, in return, outputs corresponding memory entries. Table 540 comprises hash index column 550 and four hash entry columns: 560, 570, 580, and 590. The number of possible hash entry columns is determined by the mask length decrements of store 520. In this example, each mask length in store 520 is four bits shorter than the previous mask length, so there are four possible hash entry columns. This is because each row in table 540 corresponds to a range of intermediate mask lengths not stored in store 520. For example, store 520 stores a thirty-two bit mask length and a twenty-eight bit mask length but not mask lengths of thirty-one, thirty, or twenty-nine bits. Thus, the four hash entry columns, in one or more rows, of table 540 correspond to thirty-two, thirty-one, thirty, and twenty-nine bit mask lengths. Other rows correspond to mask length ranges of twenty-eight to twenty-five bits, twenty-four to twenty-one bits, twenty to seventeen bits, sixteen to thirteen bits, twelve to nine bits, eight to five bits, and four bits to one bit. Thus, every possible mask length can be represented in table 540.

Each hash entry column of table 540 contains a chain of hash entries, such as the chain of hash entries 561 and 571. Each hash entry comprises four fields: a masked address, a mask length, a route pointer, and a link pointer. In the example, hash entries 561 and 571 contain masked addresses 562 and 572, mask lengths 563 and 573, route pointers 564 and 574, and link pointers 565 and 575. The first two fields store topological information. If, for example, hash entry 561 stores information about host 126, then masked address 562 equals 129.11.35.147 and mask length 563 is thirty-two. Likewise, if data on router 125 is saved in hash entry 571, then masked address 572 is 129.11.35.144 and mask length 573 is twenty-nine.

The third hash entry field, the route pointer, points to the most efficient output interface for the address stored in the first two fields. In the example, fields 562 and 563 store information for host 126, while fields 572 and 573 maintain data on router 125. Therefore, route pointer 564 and route pointer 574 should point towards the interface to input/output bus 102, which leads to both host 126 and router 125.

The fourth field, the link pointer, points to the next hash entry, if any, in the chain. For example, link pointer 565 contains a pointer to hash entry 571, while link pointer 575 contains a pointer to the next hash entry or, if it is the last entry in the chain, a null value. In the preferred embodiment, the hash entries in a chain are ordered by descending mask lengths. In this example, the thirty-two bit mask length 563 is greater than the twenty-nine bit mask length 573, and, therefore, hash entry 560 precedes hash entry 570 in the chain.

Hash index column 550 contains a series of hash indices. Each hash index has been calculated by hashing the one or more addresses stored in the corresponding hash entries. This process is performed when an address is being added to the topological layout. For example, hash index 551 was produced by hashing the first address of the addresses stored in hash entry 561 and hash entry 571 using hash function processor 530. These mask lengths are provided by a route-update subsystem, such as subsystem 230, as it updates the topological layout stored in hash table 540. As in conventional hashing systems, hash table collisions can occur, these are processed by subsystem 500 using conventional collision resolution techniques known to those skilled in the art.

Referring to FIG. 5b, a circuit diagram of mask function processor 510 is shown. It comprises mask length decoder 591 and a set 592 of thirty-two AND gates, each with two inputs. Mask length decoder 591 receives mask lengths from mask length store 520 and converts them to thirty-two bit masks. Each mask is output in parallel, from most significant to least significant bit, on a set 593 of thirty-two communication lines. Each line of set 593 acts as an input to an AND gate of set 592. The remaining inputs of the AND gates receive a thirty-two bit destination address, also from most significant to least significant bit. For mask bits of "1", the corresponding destination address bits pass through the AND gates. For mask bits of "0", the corresponding destination address bits are blocked and "0"'s are output.

Figure 6:
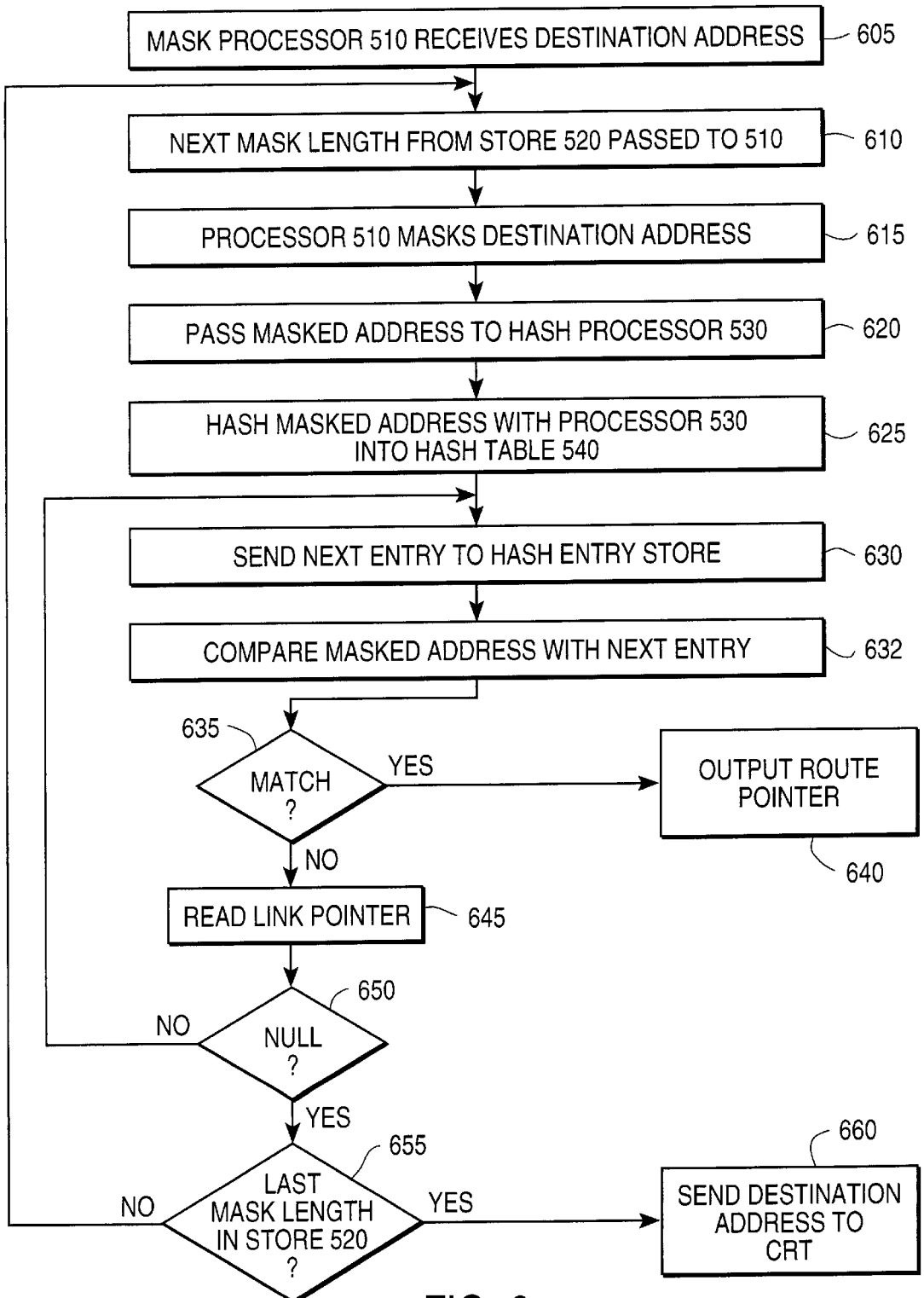
FIG. 6 is a flow chart illustrating a method for performing a reverse hash search in accordance with the present invention.

Referring to FIG. 6, there is shown a flow chart of reverse hash search processing in accordance with the present invention. The process in FIG. 6 is a first embodiment of subroutines 410 through 425 in FIG. 4. In step 605, a thirty-two bit destination address is received by subsystem 500 and passed to mask function processor 510 via communication line 501. In step 610, the next mask length, which is the first mask length on the first pass, is passed from register 521 over communication line 504 to mask function processor 510. Typically, the initial mask length is thirty-two bits, so that packets which are to be routed to local host computers may be quickly determined. In step 615, mask function processor 510 masks the address in accordance with the mask length. In step 620, the masked address is passed to hash function processor 530. In step 625, hash function processor 530 hashes the masked address into hash table 540 at, for example, index 551. In step 630, the entry corresponding to the hash index is sent to hash entry store 545 for examination. In step 632, masked destination address is compared with the masked address 562. In step 635, it is determined whether the two addresses match. If the masked destination address matches masked address 562 in step 635, the route has been successfully found, and the route pointer 564 is passed to the input/output subsystem 210 over line 507 in step 640. However if the match in step 635 fails, link pointer 565 is accessed in step 645. Step 650 determines whether there is a next hash entry by assessing whether link pointer 565 contains an address or a null value. Since, in this case, link pointer 565 contains the address of hash entry 571, steps 630 through 650 are repeated for entry 571. If entry 571 fails to produce a match and contains a null link pointer, indicating it is the last entry of the chain, step 655 determines if the last mask length in store 520 has been applied to the received address. If the last mask has been applied, the received destination address is not currently stored in the topological layout of subsystem 500 and, in step 660, the search terminates. If the last mask length has not yet been processed, the routine loops back to step 610, and steps 610 through 655 are repeated.

The above discussion describes a process in which a four bit decrement in the mask lengths sent from store 520 is used upon each pass through the mask function processor.

However, the present invention is not limited to this embodiment. If the above method results in too many asking table collisions, the system may be adapted to drop only one or two least significant bits between masks. Conversely, if the method above is too slow for certain purposes, the number may be increased to eight or sixteen bits dropped between masks. There is a trade-off, however: if only a few bits are dropped between masks, the chance of a collision is reduced but the overall time of performance is increased since the number of masks is increased. If, for example, one bit is dropped after each mask, thirty-two mask functions and tables will be required, significantly slowing the performance of the hash subsystem. If, on the other hand, many bits are dropped between masks, the overall speed of the search is increased but so is the chance of collision, since the size of the mask increases.

Figure 7:
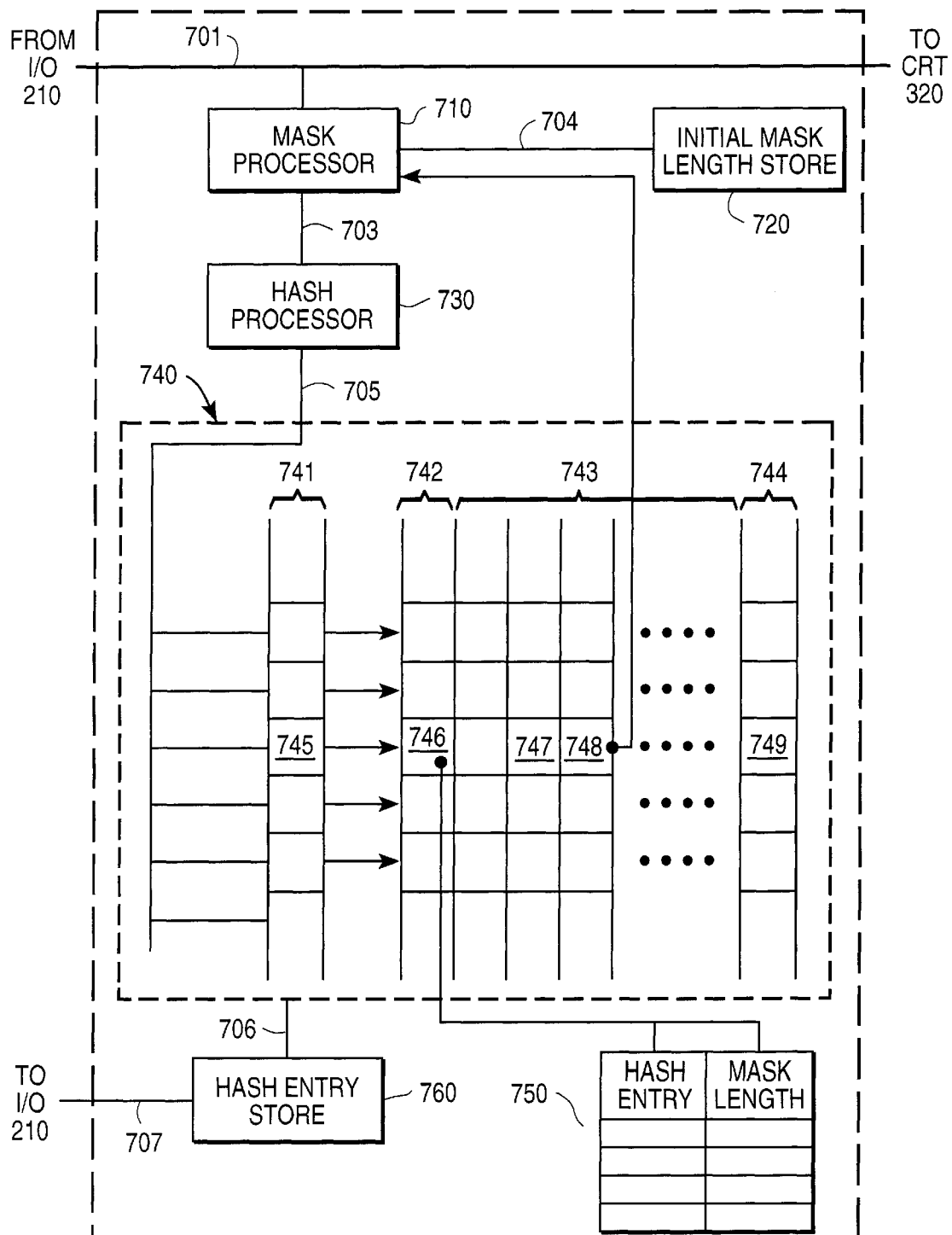
FIG. 7 is a block diagram illustrating a system for performing a hierarchical hash search in accordance with the present invention.

Referring to FIG. 7, there is shown a hierarchical hash subsystem 700 in accordance with the invention. Subsystem 700 is the second and more complex of the two described embodiments of hash subsystem 310. It is preferably used in environments with numerous mask lengths, where the performance of the reverse hashing technique begins to deteriorate. Hierarchical hash subsystem 700 is connected to an input/output subsystem, such as subsystem 210, by communication lines 701 and 707 analogous to lines 330 and 340. Line 701 also connects subsystem 210 to a compressed radix tree subsystem, such as subsystem 320. Subsystem 700 comprises mask function processor 710, initial mask length store 720, hash function processor 730, hash table 740, hash entry store 760, and state stack 750.

Briefly outlining the operation of hierarchical hash subsystem 700, mask function processor 710 generates a masked address from the incoming destination address and a given mask length obtained either from mask length store 720 or from a mask length entry in hash table 740. Hash function processor 710 then uses the masked address as a key to generate an index into has table 740 where a relevant hash entry is found. Hash table 740 has entries with masked addresses and corresponding sets of mask lengths and route pointers. Hash entry store 760 temporarily holds entries, one at a time, from table 740 as the masked addresses of the entries are examined for a match. For this purpose, store 760 is connected to table 740 by communication line 706 and comprises a series of registers of a sufficient length to handle a hash entry of table 740. In addition output line 707 is connected to store 760.

A preferred embodiment of mask function processor 710, implemented using conventional logic circuitry and configured to function as described herein, is diagrammed in FIG. 5b. It is connected to hash function processor 730 by communication line 703, and to initial mask length store 720 by communication line 704.

Hash function processor 730, a preferred embodiment also configured to function as described herein, is implemented using conventional logic and is connected to hash table 740 by communication line 705.

Initial mask length store 720 comprises a register, storing a mask length. In a preferred embodiment, the mask length stored in the register of store 720 is eight bits. The register is capable of being enabled in a conventional manner by mask processor 710, allowing store 720 to provide the initial mask length as needed.

Hash table 740 comprises four columns: hash index column 741, column 742 which stores masked addresses and mask lengths, column 743 which contains a set of mask lengths for each masked address of column 742, and column 744 which maintains a route pointer for each masked address of column 742. The masked addresses of column 742 act as keys to hash table 740. Each row of mask lengths in column 743 is arranged in the order of descending mask length, but each is longer than the mask length of the associated masked address in column 742. For example, mask length 747 precedes mask length 748 in the row of mask lengths associated with masked address 746. Therefore, mask length 747 is of greater value than mask length 748, and both are greater than the mask length of address 746. Column 744 stores a pointer address, address 749 for example, associated with the most efficient output interface for each masked address of column 742.

State stack 750 is a small stack that is used to store a reference to the most recent matching address and mask length. Connected to table 740 by communication line 708, it is used to enable backtracking to a previous state of the hierarchical hashing subsystem during the process of a route search, so that the search process can resume from a previously stored state.

Figure 8:
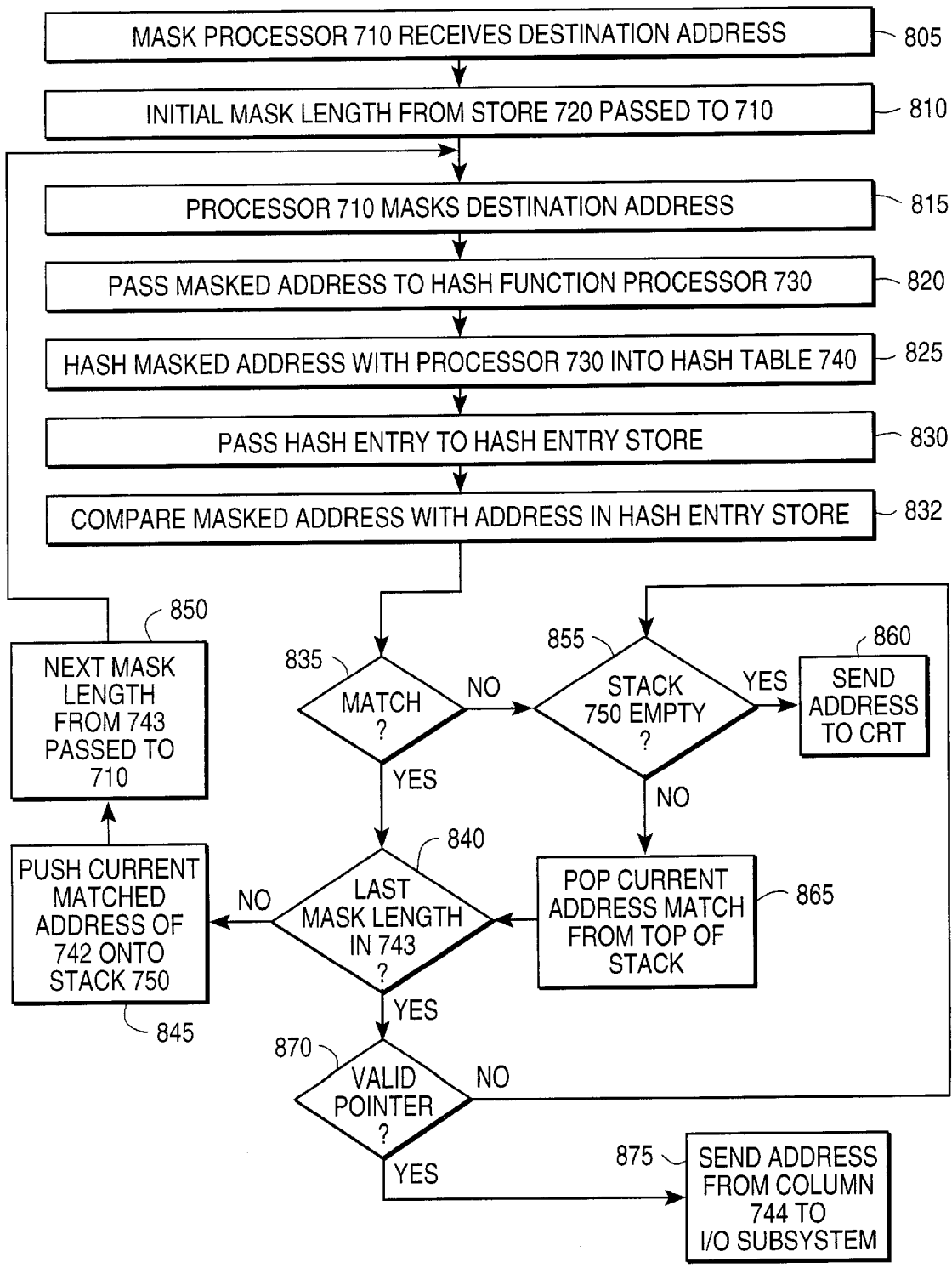
FIG. 8 is a flow chart illustrating a method for performing a hierarchical hash search in accordance with the present invention.

Referring to FIG. 8, there is shown a flow chart of hierarchical hash search processing in accordance with the present invention. The process in FIG. 8 is a second embodiment of subroutines 410 through 425 in FIG. 4. In step 805, a destination address is received from the input/output subsystem 210 and passed to mask function processor 710 over line 701. In step 810, the initial mask length in store 720 is sent to mask function processor 710 over communication line 704. In step 815, mask function processor 710 masks the destination address in accordance with the mask length of store 720. In step 820, the masked address is forwarded to hash function processor 730 which, in step 825, hashes the masked address into hash table 740. It is assumed, in this example, that the address hashes into index 745. In step 830, the entry corresponding to the hash index is sent to hash entry store 760 for examination. Step 832 then compares the masked address with the corresponding masked address field, in this case field 746, of column 742.

If a match is made in step 832, step 835 directs the search to step 840 in order to search for a match with a more specific address. Step 840 determines whether all mask lengths of the set corresponding to masked address 746 have been processed. If any mask lengths are unprocessed, step 845 pushes the matched address of steps 832 and 835 onto state stack 750. For example, if mask lengths 747 and 748 have not yet been used to mask the destination address, the last matching address, 745, and mask length are pushed onto the top of stack 750. In step 850, the next unprocessed mask length is passed to mask function processor 710 from row 745. Steps 815 through 835 are repeated for the next mask length. The next mask length is used to mask the received address, which is then again hashed into table 740. If the corresponding masked address and mask length of column 742 matches the processed address, it is the current and most specific address located and should be used to output the packet unless a more specific address is located.

If a match is not made in steps 832 and 835, step 855 determines whether stack 750 is empty. If step 750 is being invoked during a matchless first iteration of the search, the stack will be empty, since there were no prior iterations. If this is the case, no match was made for the received address, and it is passed to the compressed radix tree subsystem in step 860. If step 750 is invoked in later iterations, the stack contains the matched addresses and mask lengths of prior iterations. In this case, the most specific address and mask length are popped from the top of stack 750 in step 865. The process then continues at step 840.

Once every mask length associated with the current address in column 742 has been processed, the current address is the most specific match stored in table 740. Step 870 then determines whether the corresponding route pointer of column 744 is valid. If valid, the packet is output along the designated output in step 875. If not, this is an indication that the search should continue and the process loops back to step 855.

Figure 9:
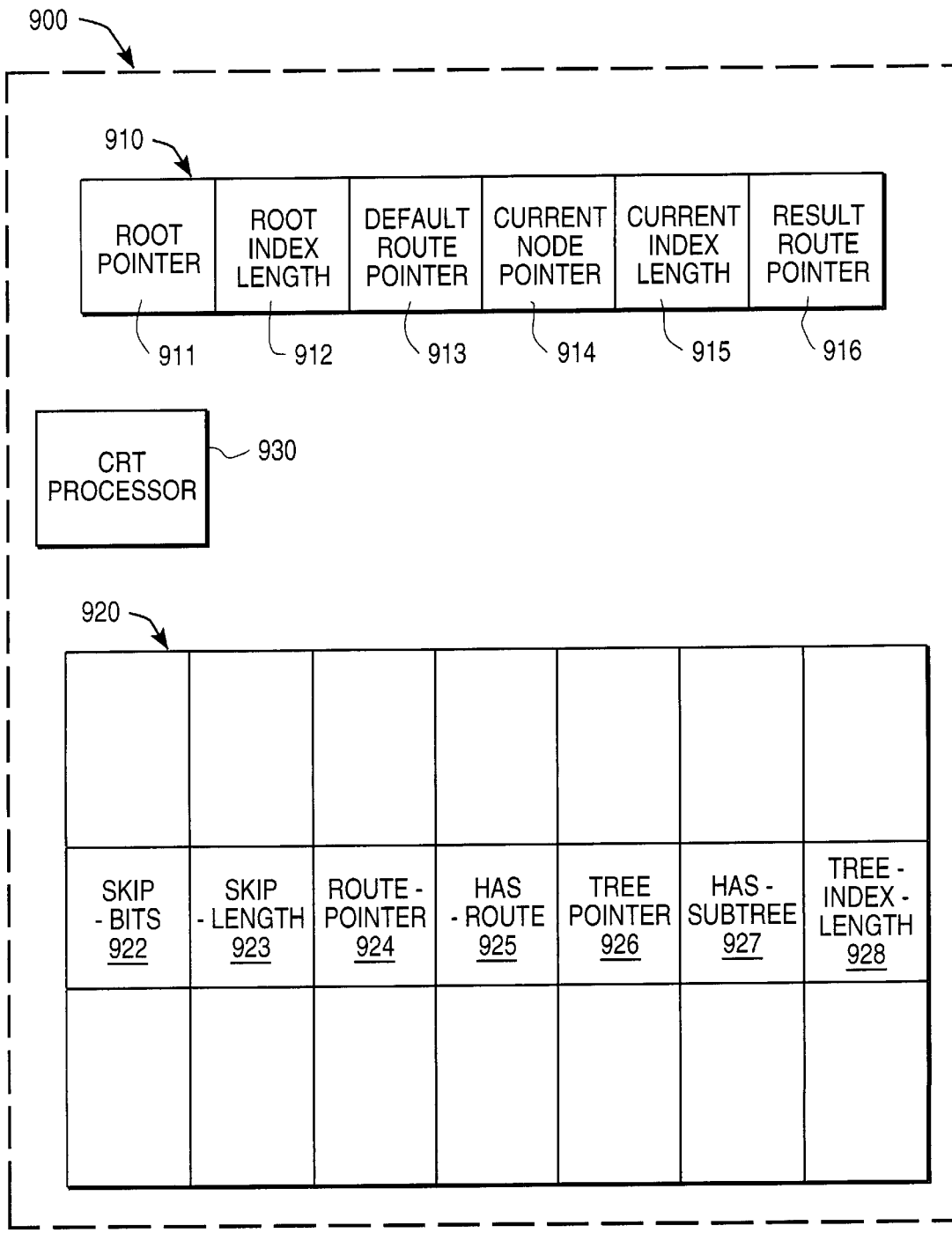
FIG. 9 is a block diagram illustrating a system for performing a compressed radix tree search in accordance with the present invention.

Referring to FIG. 9, a subsystem 900 for performing a compressed radix tree search is shown. Subsystem 900 is a preferred embodiment of subsystem 320. It does not encounter the collision problems of the faster hashing subsystems detailed above, and, therefore, it may completely determine whether an address is stored in a router. For this reason, it is an ideal backup to the reverse and hierarchical hashing techniques. Subsystem 900 comprises register set 910, a tree of nodes which includes root node 920, and processor 930.

Briefly outlining the operation of compressed radix tree subsystem 900, processor 930 receives message destination addresses and attempts to locate the address of an output route entry by progressively searching the tree of nodes starting from root node 920 based on the contents in register set 910, as detailed below.

Register set 910 comprises six registers, 911 through 916. Register 911 contains a root pointer, which points to the root tree node 920. Register 912 stores a root index length which is the number of bits needed to represent an index into the root tree node. Register 913 maintains a default route pointer which points to the default output interface to be taken by a packet if the packet address is not located. The current node pointer of register 914 indicates the node currently being processed. Register 915 stores a current index length which is the number of bits needed to represent an index into the node to which the current node pointer in register 914 points. The result route pointer of register 916 points to the output interface route currently determined to be the most efficient.

Root node 920, as with all of the nodes in the tree, is a table of seven columns and a variable number of rows. The number of rows in each node is determined by the number of bits required to index the node. For example, if two bits are required to index a node, the number of rows in the node is $2^2$ or four. In the case of root node 920, the number of bits required to index is recorded in register 912. Row 921, representative of other rows, has seven fields, 922 though 928. Field 922, the skip-bits field, contains a bit pattern to be matched against a portion of a destination address. Field 923, the skip-length field, contains the number of bits in the skip-bits field 922. Field 924, the route-pointer field, contains either a null value or a pointer to an output interface. Field 925, the has-route field, is high if the route-pointer field 924 stores a valid pointer to an interface. Field 926, the tree-pointer field, contains either a null value or a pointer to another tree node. Field 927, the subtree field, indicates whether tree-pointer field 926 has a valid pointer to another tree node. Field 928, the tree-index-length, contains the number of bits needed to represent an index into the tree node pointed to by tree-pointer field 926.

Compressed radix tree (CRT) processor 930, implemented using conventional logic circuitry and configured to function as described herein, receives message destination addresses from the hash function subsystem 310, which is analogous to communication line 360 of FIG. 3. Processor 930 attempts to locate the address of an output route entry. Once a destination address is located, the address of the corresponding output interface is sent to the router, which is analogous to output bus 350 of FIG. 3.

Figure 10:
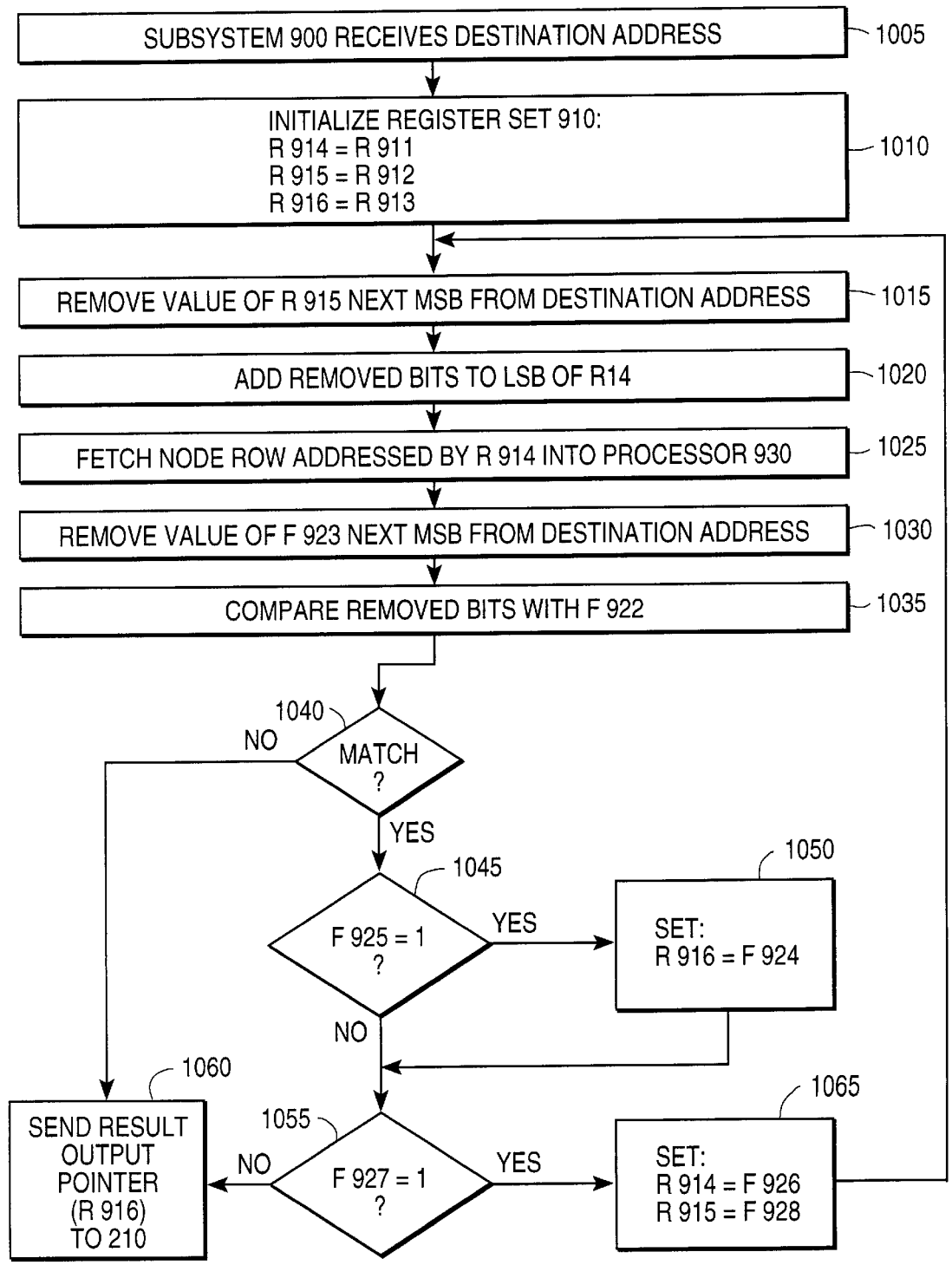
FIG. 10 is a flow chart illustrating a method for performing a compressed radix tree search in accordance with the present invention.

Referring to FIG. 10, a flow chart of a compressed radix tree search is shown. In step 1005, a message address is received, via input line 901, from step 660 of the reverse hash search or step 860 of the hierarchical hash search above. In step 1010, register set 910 is initialized to search root node 920: current node pointer register 914 is set to the value of the root pointer register 911, the current index length register 915 is set to the value of the root index register 912, and the result route pointer register 916 is set to the value of the default route pointer register 913. In step 1015, a number of most significant bits, determined by the current index length of register 915, is extracted and removed from the destination address, thus truncating the address. In step 1020, the extracted bits are added to the current node pointer of register 914 to form the address of a row of the current node. In step 1025, the row thus addressed, row 921 of node 920 for example, is fetched into the processor for further processing. In step 1030, a number of next most significant bits, determined by the skip-length of field 923, is extracted and removed from the destination address, further truncating the address. In step 1035, the extracted bits are compared with the skip-bits field 922. In step 1040, the result of the comparison is checked. Note that the value of skip-length field 923 may be zero in which case a match is considered to have been made. If a match is not made in step 1040, step 1060 is executed and the current route pointer of field 916 is returned to subsystem 210. If a match is made in step 1040, the has-route field 925 is checked in step 1045. If the has-route field is high, row 921 has a valid route-pointer in field 924, and, in step 1050, the result route pointer register 916 is set equal to route-pointer field 924. If the has-route field 925 is low, row 921 does not contain a valid route-pointer in field 924. In either case, step 1055 follows from step 1045 or step 1050. In step 1055, the subtree field 927 is checked. If subtree field 927 is low, row 921 does not have a valid subtree and, in step 1060, the result output pointer of field 916 is sent to subsystem 210. If subtree field 927 is high, row 921 has a valid subtree, and, in step 1065, current node pointer register 914 is set to the value of tree-pointer field 926 and the current index length register 915 is set to the value of tree-index-length field 928. Step 1065 returns to step 1015. Steps 1015 through 1065 may be executed a number of times but eventually step 1060 is executed and the most recent value of the result route pointer register 916 is output. Due to the fact that during each iteration of steps 1015 and 1030 at least one bit is removed from the destination address, the process is guaranteed to terminate.

From the above description, it will be apparent that the invention disclosed herein provides a novel and advantageous method and system for searching a table and more specifically a routing table. The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention which is set forth in the following claims.

What is claimed is:

1. An adaptive information search method for information referenced by keys, the method comprising:
   (a) performing a reverse-hashing search in response to said keys having a first characteristic;
   (b) performing a hierarchical-hashing search in response to said keys not having said first characteristic; and
   (c) performing a compressed radix tree search in response to (a) and (b) not providing results according to a specified criterion.

2. An adaptive information search method as in claim 1, wherein the information is a table, the keys correspond to addresses, and the first characteristic corresponds to said keys not having more than a given number of different lengths.

3. An adaptive information search method as in claim 1, wherein the specified criterion corresponds to a period of time.

4. An adaptive information search method as in claim 1, wherein the information is a table, the keys correspond to addresses, the first characteristic corresponds to said keys not having more than a given number of different lengths, and the specified criterion corresponds to a period of time.

5. An adaptive information search method as in claim 1, wherein the reverse-hashing search, the hierarchical-hashing search, and the compressed radix tree search are longest prefix match searches.

6. An adaptive information search method for information referenced by keys, the method comprising:

performing a hashing search; and, performing a compressed radix tree search in response to the hashing search not providing results according to a specified criterion.

7. An adaptive information search method as in claim 6, wherein the information is a table and the keys correspond to addresses.

8. An adaptive information search method as in claim 6, wherein the specified criterion corresponds to a period of time.

9. An adaptive information search method as in claim 6, wherein the information is a table, the keys correspond to addresses, and the specified criterion corresponds to a period of time.

10. An adaptive information search method as in claim 6, wherein the hashing search and the compressed radix tree search are longest prefix match searches.

11. A hierarchical hashing search method for information referenced by keys, comprising:

(a) hashing an initial portion of a target key to obtain an initial hash entry;

(b) determining, in response to the initial hash entry, a set of mask lengths; and (c) iteratively searching for subsequent hash entries using the set of mask lengths and further mask lengths determined as a result of said searching.

12. A method as in claim 11, further comprising performing a compressed radix tree search in response to (a)–(c) not providing results according to a specified criterion.

13. A method as in claim 12, wherein the specified criterion corresponds to a period of time.

14. A reverse hashing search method for information referenced by keys, comprising:

(a) searching using a target key in its entirety; and (b) in response to no match resulting from (a), iteratively hashing portions of the target key using a set of mask lengths, said mask lengths being selected in decreasing size order.

15. A method as in claim 14, further comprising performing a compressed radix tree search in response to (a)–(b) not providing results according to a specified criterion.

16. A method as in claim 15, wherein the specified criterion corresponds to a period of time.

17. A compressed radix tree search method for information referenced by keys, the keys corresponding to nodes of a tree, the method comprising:

(a) selecting an initial node as a current node, the current node having a plurality of entries;

(b) selecting an initial length as a current index length;

(c) forming an intermediate key in response to a most significant portion of a target key, the most significant portion corresponding to the current index length;

(d) selecting one of said entries of the current node using the intermediate key and determining the skip length contained in said entry;

(e) comparing a next most significant portion of the target key equal in length to the skip length with a skip value;

(f) in response to the next most significant portion of the target key matching the skip value, accessing a node field;

(g) in response to the node field containing a null value, selecting the information in an information field;

(h) in response to the node field not containing a null value, selecting the node corresponding to the node field as the current node, removing the most significant portion and the next most significant portion from the target key, determining an index length from an index field, and iterating (c)–(h).

18. A compressed radix tree search method as in claim 17, further comprising terminating further processing in response to a complete match with the target key being determined.

19. A method of organizing information into a compressed radix tree, the method comprising:

(a) forming a node corresponding to a partial key having a selected length;

(b) in response to said partial key corresponding to at least one child key, storing in said node a sub-tree indicator and sub-tree index length indicator corresponding thereto; and (c) iterating (a) and (b) until the information is fully organized.

20. An adaptive information search system for information referenced by keys, comprising: a hashing search subsystem adapted to perform a hashing search; and a compressed radix tree search subsystem adapted to perform a compressed radix tree search in response to said hashing search not providing results according to a specified criterion.

21. A system as in claim 20, wherein the specified criterion is finding a desired correspondence within a given time period.

22. A system as in claim 20, wherein the specified criterion is finding correspondence between a target key and one of a set of stored keys.

23. A system as in claim 20, wherein said hashing search subsystem includes a hierarchical hashing search subsystem.

24. A system as in claim 20, wherein said hashing search subsystem includes a reverse hashing search subsystem.

25. A compressed radix tree search system, comprising:

a register set storing a root node pointer, a root index length, a default route pointer, a current node pointer, a current node index, and a result route pointer;

a plurality of tree nodes, each having a table of entries and each entry containing a skip-bits field, a skip-length field, a route-pointer field, a has-route field, a tree-pointer field, a has-subtree field, and a tree-index-length filed; and a processor operatively connected to the register set and the plurality of tree nodes, the processor comparing a target address with data corresponding to the tree nodes according to a compressed radix tree search, starting from a root node specified by the root node pointer and route index length and progressing therefrom by associating with the current node pointer and current node index select ones of the tree nodes based on the skip-bits field, the skip-length field, the tree-pointer field, the has-subtree field, and the tree-index length field, the processor producing as output in response to a match being found with the target address a route specified by the route-pointer field and the has-route field of a corresponding one of the plurality of tree nodes, the processor further producing as output in response to no match being found a route specified by the default route pointer, the processor further providing said output on the result route pointer.

26. A system as in claim 25, further comprising a hashing search subsystem pre-processing said target address and providing as output a result route in response to correspondence between the target address and a stored address being determined by the hashing search subsystem.

27. A system as in claim 25, wherein each of the plurality of tree nodes is of a predetermined size.

28. A system as in claim 25, wherein each of the plurality of tree nodes is of a variable size.

29. A system as in claim 25, wherein each skip-bits field has a null value.

30. An adaptive information search method for information referenced by keys, the method comprising:

performing a hashing search; and performing simultaneously a compressed radix tree search.

31. An adaptive information search system for information referenced by keys, comprising:

a hashing search subsystem adapted to perform a hashing search; and a compressed radix tree search subsystem adapted to perform a compressed radix tree search simultaneously to said hashing search.

* * * * *